United States Patent [19]

Mittersteiner Urzua

[11] Patent Number: 5,522,430
[45] Date of Patent: Jun. 4, 1996

[54] FLOW VALVE OR SHUT-OFF COCK FOR FLOW NETWORKS WITH SEALING MEANS

[76] Inventor: Melchor J. Mittersteiner Urzua, Estado No235 OF. 511, Santiago, Chile

[21] Appl. No.: 341,871

[22] Filed: Nov. 15, 1994

[51] Int. Cl.⁶ ..................................................... F16K 5/04
[52] U.S. Cl. ..................................... 137/625.47; 251/309
[58] Field of Search .................................... 251/309, 319, 251/310; 137/625.47

[56] References Cited

U.S. PATENT DOCUMENTS

| | | | |
|---|---|---|---|
| 3,552,439 | 1/1971 | Siver | 251/309 X |
| 3,750,704 | 8/1973 | Burke et al. | 137/625.47 |
| 3,783,900 | 1/1974 | Woldbillig | 251/309 X |
| 3,814,120 | 6/1974 | Moen . | |
| 3,974,869 | 8/1976 | Abe et al. . | |

*Primary Examiner*—John C. Fox

[57] ABSTRACT

A flow valve or shut-off cock for flow networks having sealing means of particular features which make its design easy and increase its tightness and useful life. This valve provides sealing means reacting in proportion to the flow pressure, for which purpose sealing means of the lung type are available, that is to say, the sealing means consist in a flexible and hollow body, which is inflated by the flow pressure going into the valve, pressing one of the walls of the flexible element against the opening of the valve intended to be blocked or obstructed. This sealing element of the lung type is controlled by the rotation of a rigid stem component partially surrounding it in its upper zone and in external side areas.

11 Claims, 5 Drawing Sheets

FLOW VALVE OR SHUT-OFF COCK FOR FLOW NETWORKS WITH SEALING MEANS

BACKGROUND OF THE INVENTION

1. Field of the Invention

The invention is related to a flow valve or shut-off cock for flow networks with sealing means of particular features which make its design easy and increase its tightness and useful life.

2. Description of the Related Art

Several designs of flow valves are known, which have tried to simplify their manufacture and increase the tightness, but most of them loses their efficiency before working pressures higher than the normal ones. There are others, which, although reducing the number of components making up the valve (which facilitates the assembly of them), must make use of complex geometry which make die making more expensive.

A group of known valve designs, such as that under patent U.S. Pat. No. 3,974,869, consists in an elastic envelopment around a rigid stem which acts as the core of the system. The efficiency of these valves depends on the quality of the material with which the elastic component is manufactured, and makes it necessary a very accurate construction of the components in order to ensure a suitable fit among them and a low friction coefficient. Notwithstanding this, and due to the fact that the sealing means of these valves are independent from the flow pressure, the pressure exerted by the sealing means against the inner walls of the valve is constant and generates unnecessarily high friction forces, although flows with low pressures are controlled, which reduces their useful life. Another disadvantage of these valves is related to the restrictions caused by the election of materials of the valve body in order to ensure that their coefficient of thermal expansion be lower than the coefficient of thermal expansion of the sealing elements.

Another type of valve known is that under patent U.S. Pat No. 3,814,120, which is very complex due to the number and shape of its components. The quality of the sealing effect is constant, showing problems at high pressure ranges.

The sealing elements of the known valves mainly act on a measure exceeding the same with respect to the sizes of the valve body, the compression forces of the sealing material being those which exercise the sealing function itself. According to this, these designs of valve demand the existence of an element of inner rigid stem in the sealing element acting as supporter.

SUMMARY OF THE INVENTION

On the contrary, the valve under this invention offers sealing elements proportionally reacting to the flow pressure.

In schematic terms, the invention is based on providing sealing means of the lung type, that is to say, the sealing means consist in a flexible and hollow body, which is inflated by the flow pressure going into the valve, pressing one of the walls of the flexible element against the opening of the valve intended to be blocked or obstructed. This sealing element of the lung type is controlled by making a rigid stem component to rotate partially surrounding it in its upper zone and in external side areas.

The valve of the invention is basically made up of a substantially traditional valve body and a cylindrical stem composed of two parts: an upper component which is rigid, and a lower component formed by an elastomeric material.

The upper component of the stem is cylindrical and rigid with the shape of an inverted cup. Its mantle shows at least four openings in its medium line.

The lower component of the stem is flexible and abuts in the inner lower part of the rigid component of the stem, so that at least three of its at least four openings are partially blocked by the flexible body and the fourth opening of the rigid component is totally blocked by said flexible body.

With the structure of valve already described, a cylindrical and hollow stem in its lower part is obtained, which defines a chamber to which the flow accesses through one of the openings existing in the medium line of its mantle. These openings innerly top out in flexible blocks, which allow the dragging of the flexible body when the rigid stem rotates. In addition, the compound stem mantle shows a (closing) flexible block projecting out of the mantle in a location in which it shall be in front of one of the flow outlets in the body of the valve. This flexible closing block shall fit to the flow outlet when the stem is aligned in a closing position due to the pressure exerted by the flow when entering the stem chamber through one of the openings.

DESCRIPTION OF THE DRAWINGS

In order to better understand the invention, it shall be described with the help of illustrations, which show two preferred modalities of the invention and shall have only an explanatory nature, this invention not being limited to said modalities.

DETAILED DESCRIPTION OF INVENTION

Figure 1:
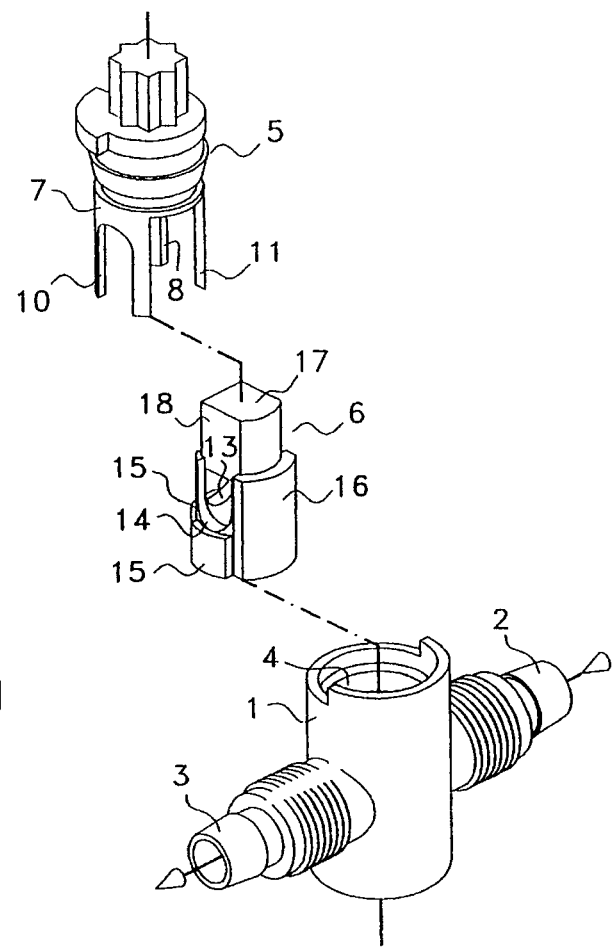
FIG. 1 is a parallel perspective showing an exploded view of the three basic components of the invention from an upper forward right angle.
Figure 2:
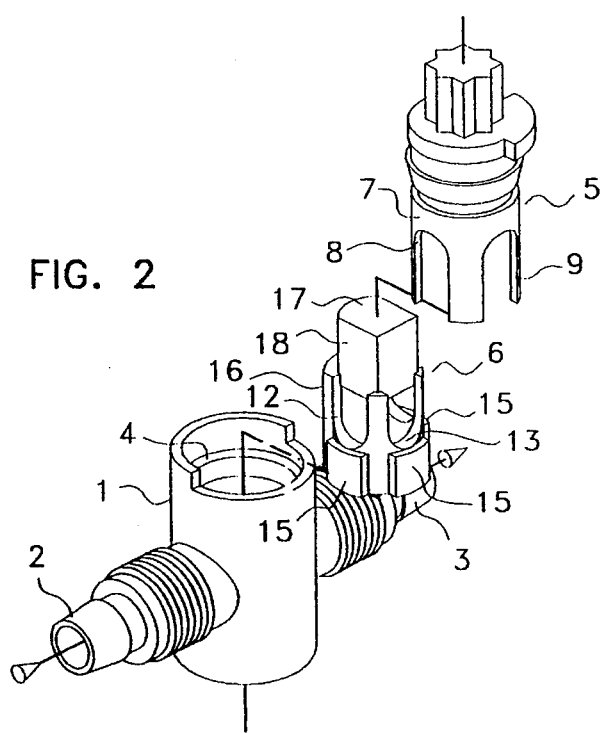
FIG. 2 is a parallel perspective showing an exploded view of the three basic components of the invention from an upper rear left angle.
Figure 3:
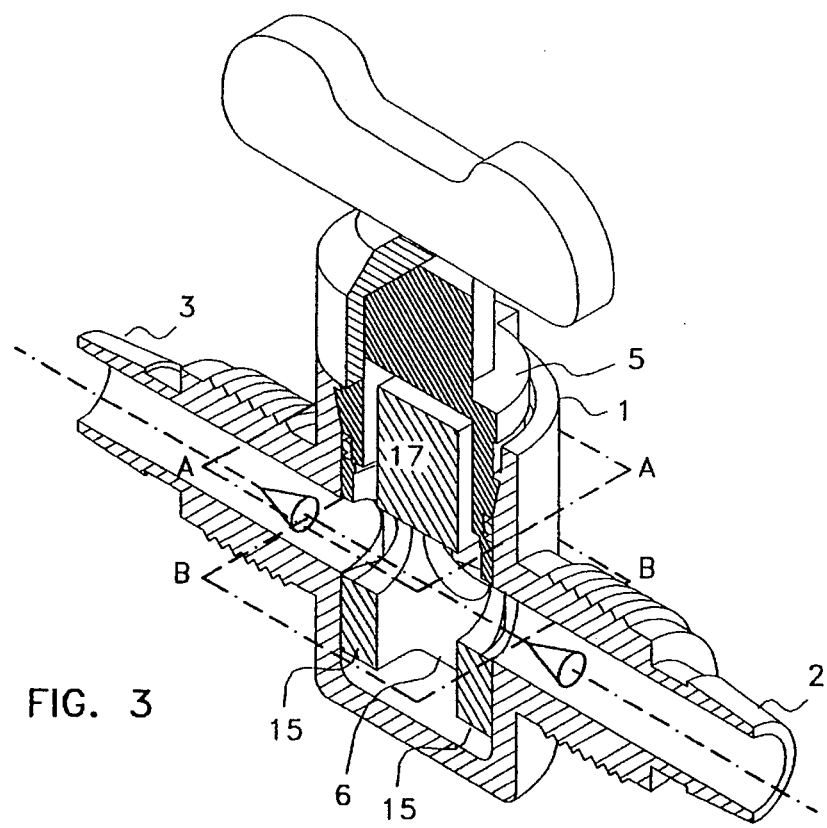
FIG. 3 is a parallel perspective showing the assembly of a two-way opened valve with its body in section.

As shown in FIGS. 1 through 6, a two-way valve, according to the invention, consists in a valve body 1 of the standard type, which, in this example, has a flow inlet 2 and a flow outlet 3 laid out in 180°. A preferably cylindrical stem fits inside cavity 4 of the valve body 1, which has a rotation freedom of 90°. This stem is made up of a rigid component 5 and a flexible component 6.

The rigid stem component 5 has the traditional elements in its upper end to hold it in the valve body t and to fix an actuator to it. The lower part of the rigid stem component 5 has a particular structure, which is formed from a portion of the cylindrical mantle 7, opened in its lower basis. This portion of cylindrical mantle 7 of the rigid stem has two kinds of openings extending up to the lower end of said mantle. A first group of these openings consist in three openings 8, 9 and 10, which begin at the mantle level corresponding to the inlet level 2 and in outlet 3 of the flow of the valve body 1, which purpose is to lead the flow, whether this is going into or out of the stem assembly. A second group of openings consists in a single opening 11 which begins above the inlet and outlet level of flow, extending up to the lower end of the cylindrical mantle 7 and which purpose is to accommodate an obstruction seal projection (16) of the flexible component 6 of the stem.

Openings 8, 9 and 10 are located in successive quadrants of the cross section of the cylindrical mantle 7 and opening 11 is located in the remaining quadrant.

Both the cavity defining the cylindrical mantle 7 and its four openings 8, 9, 10 and 11 have the purpose of accommodating and holding the component of flexible stem 6, which consists in a hollow body, opened in the bottom and having three holes 12, 13 and 14—circular preferably— which fit with the upper zone of openings 8, 9 and 10 of the rigid stem component 5, respectively, so that they have a geometry and dimensions which are substantially similar to the geometry and dimensions of the flow inlet windows 2 and flow outlet windows 3 located in cavity 4 of the valve body 1. Immediately below each one of holes 12, 13 and 14, there are three corresponding risings of projections 15, which main purpose is to work as dragging elements for the simultaneous rotation of the flexible component 6 when the rigid component 5 is rotated. In addition, the component of the flexible stem 6 has an obstruction seal projection 16 which completely fills the opening 11 of the portion of the cylindrical mantle 7, slightly projecting with respect to said mantle. This projection comprises an area in the mantle of the rigid stem components exceeding the area of flow outlet opening in the wall cavity 4 of the valve body.

Figure 7:
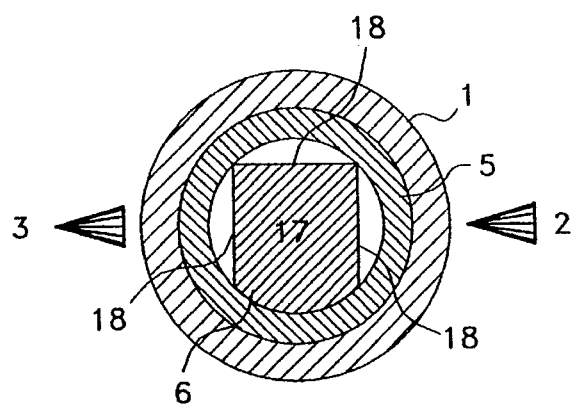
FIG. 7 is a cross-sectional view under drawing AA of FIG. 3.

The flexible stem component 6 also has an upper projection 17, which fits to the upper inner pad of the rigid stem 5, but, in order to facilitate the placement of said flexible component and avoid the formation of an air bubble, the upper projection has longitudinal recesses 18 (which may be replaced with a hole communicating the upper face of projection 17 with its lower face). FIG. 7 shows the space formed between the flexible stem component 6 and the inner wall of the rigid stem 5.

The elements described define as a whole a valve with a hollow stem and opened in the bottom, which is made up of a rigid component 5 and an elastomeric compound 6, which defines a chamber of elastic walls capable of being deformed due to the effect of flow pressure. This deformation takes place in the only element of the flexible component 6 which is subject to a difference in pressure, which is its obstruction seal projection 16, when the latter is in front of some outlet opening, such as opening 3. According to this arrangement, the elastic deformation of the obstruction seal projection 16 is positive, that is to say, the flow pressure makes this projection 16 to compress against the outlet opening 3 sealing it with a force proportional to the flow pressure, as shown in FIGS. 4 and 6.

As already stated, the valve of this invention seals in a form which is proportional to the flow pressure. Notwithstanding this, when the flow pressure is very low, the elastic features which are inherent in the elastomeric material making up the component of flexible stem 6, together with its surplus projecting out of the mantle, shall exert a sealing pressure against the edges of the flow outlet opening in cavity 4.

Figure 4:
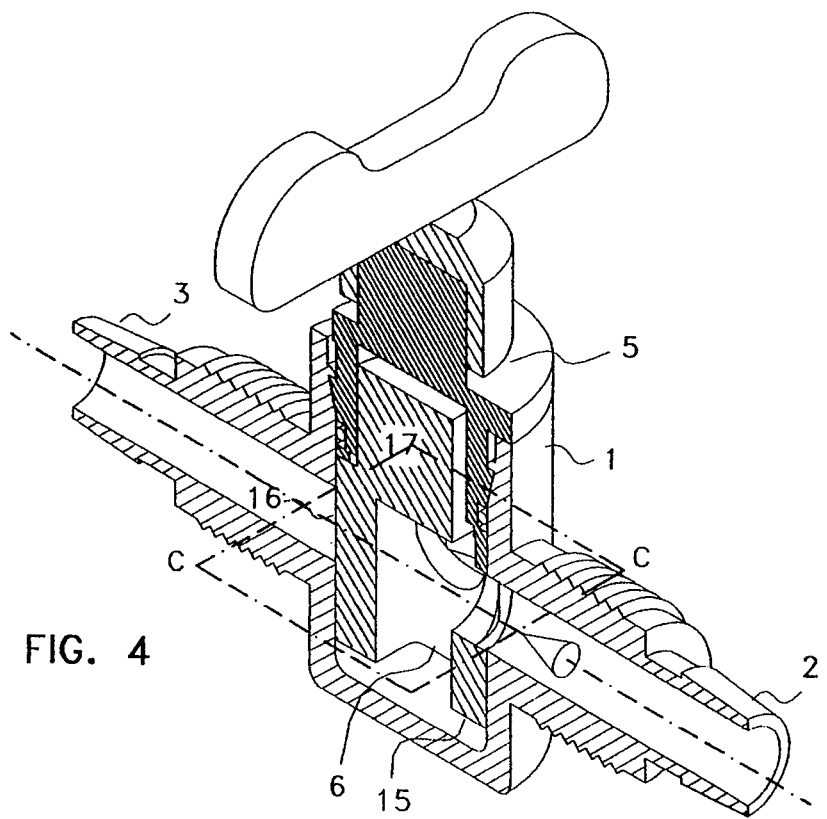
FIG. 4 is a parallel perspective showing the assembly of a two-way closed valve with its body in section.
Figure 5:
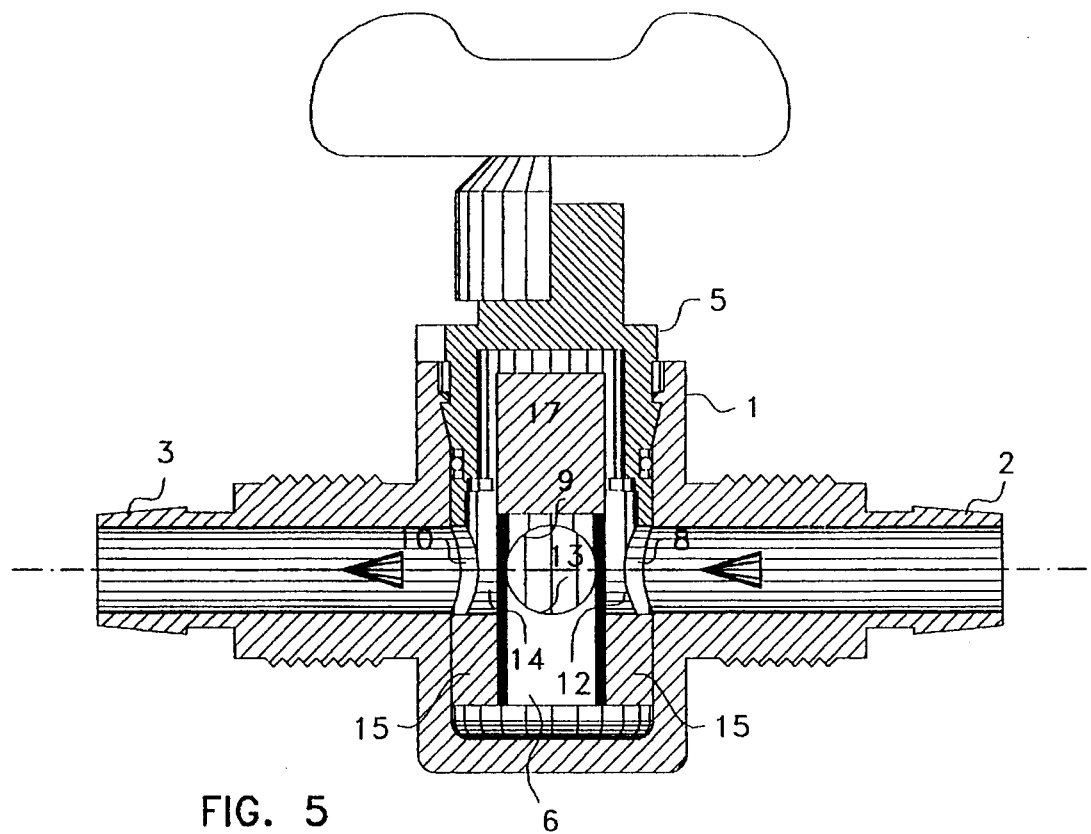
FIG. 5 is an elevation sectional view of the assembly of a two-way opened valve.
Figure 6:
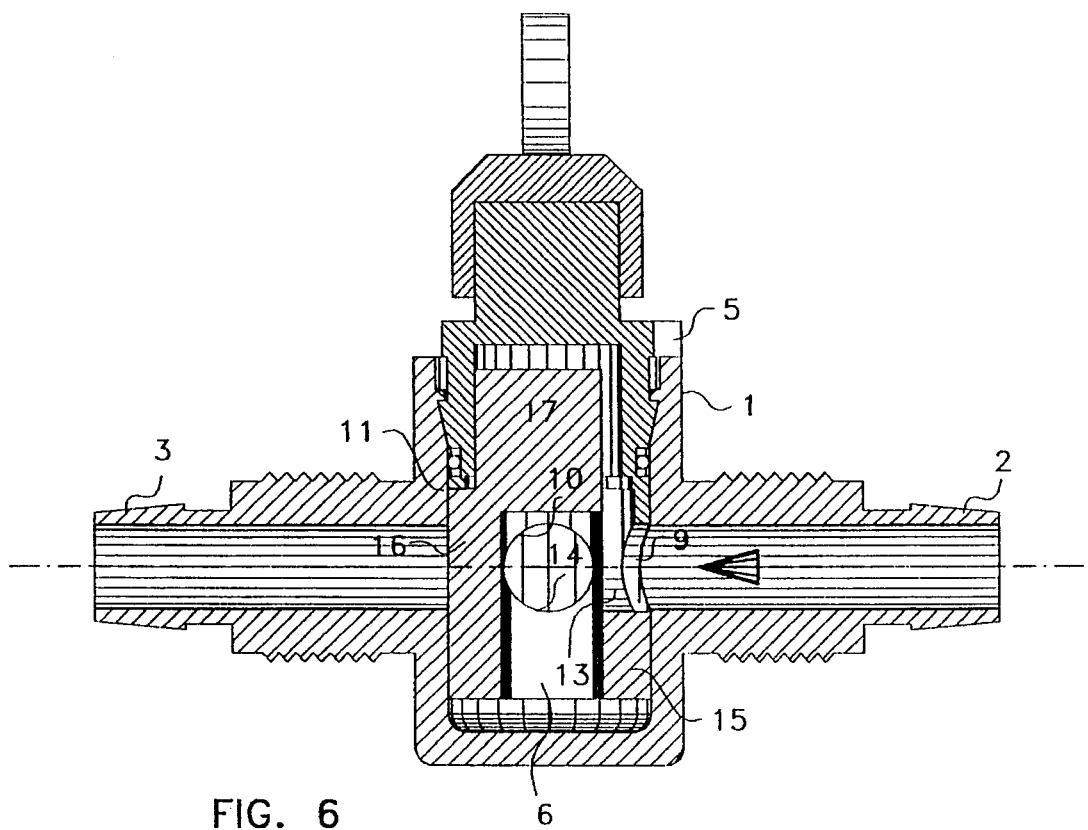
FIG. 6 is an elevation sectional view of the assembly of a two-way closed valve.
Figure 8:
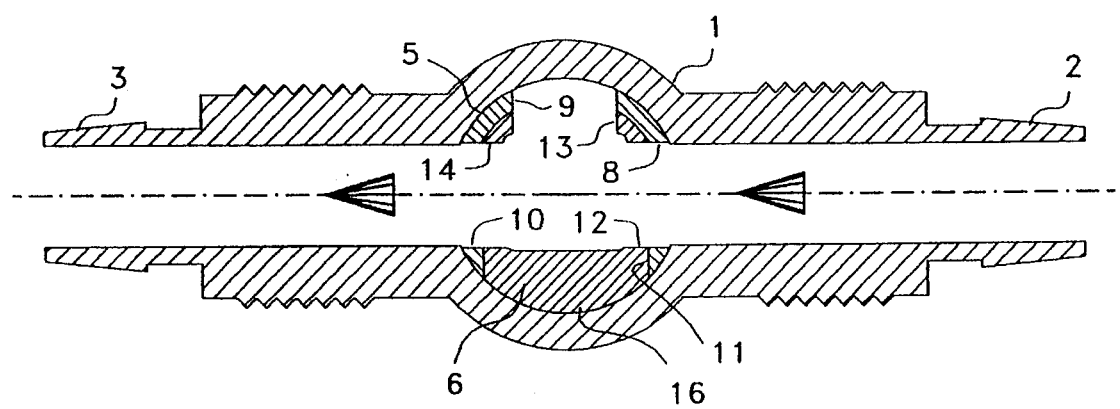
FIG. 8 is a cross-sectional view under drawing BB of FIG. 3.
Figure 9:
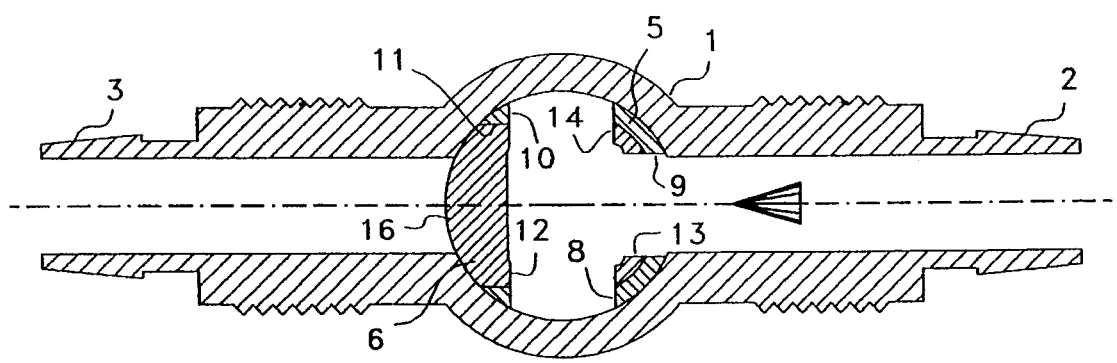
FIG. 9 is a cross-sectional view under drawing CC of FIG. 4.

In FIGS. 4, 6 and 9, the situation of the closed two-way valve is depicted, so that the obstruction seal projection 16 is in front of the outlet opening 3 of the valve body 1. When the stem assembly rotates by 90°(counterclockwise according to drawings), the two-way valve allows the passing of flow (see FIGS. 3, 5 and 8) due to the fact that the obstruction seal projection 16 is now in a position in which it does not hinder the flow inlet 2 or outlet 3, these ways becoming in front of openings 10–14 and 8–12 of the stem assembly.

It is possible that opening 9 of the rigid stem component 5 and opening 13 of the flexible stem component 6 do not exist in the version of the two-way valve, but due to manufacture reasons, it is more practical to manufacture an universal stem assembly, such as that described and depicted, which shall work both for two-way valves and three-way valves, the same stem assembly being able to be used in 3-way valves by 90° and in 3-way valves by 180°, depending on the quantity and location of the inlets and outlets of the body valve.

From this first example, certain obvious variants of the invention may be mentioned, depending on the number of outlets with which the valve body is equipped and on the rotation freedom level of the compound stem.

Should the valve body have two outlets and the compound stem may only rotate 90°, then a flow-switching valve exists, so that when an outlet is opened, the other one is closed.

Should the valve body have two outlets and the compound stem may rotate 180°, then we have a valve which can have three conditions: a first condition with the first outlet opened and the second outlet closed; a second condition inversely to the previous one, that is, with the first outlet closed and the second one opened; a third condition with both outlets opened.

In all cases, the valve shall have traditional stops which limit the rotation of the stem in order to prevent that the seal projection 16 is in front of the flow outlet, since, as already told, this seal projection shall work with a positive pressure which presses it against the corresponding flow outlet.

Notwithstanding that stated with respect to the modality of valve depicted in FIGS. 1 through 6, the lower openings of the stem compounds might not exist, but their existence facilitates the manufacture and allows to use the stem with other valve bodies having a lower flow inlet.

A second example of the flow valve using the same compound of the previous modality is shown in FIGS. 10 through 13. This valve consists in a lower flow inlet 20 with three flow outlets 31, 32 and 33 located in the medium plane of the valve body and orthogonally distributed. In FIGS. 10 through 13, only the flow inlet 20 and outlets 3t, 32 and 33 have been depicted, the valve body as such being omitted in order to facilitate the visualization of the compound stem in its different positions with respect to the flow outlets. The compound stem of this valve has a rotation freedom of 360°, that is to say, the valve body has not limiting stops for the rotation stroke of the stem.

Figure 10:
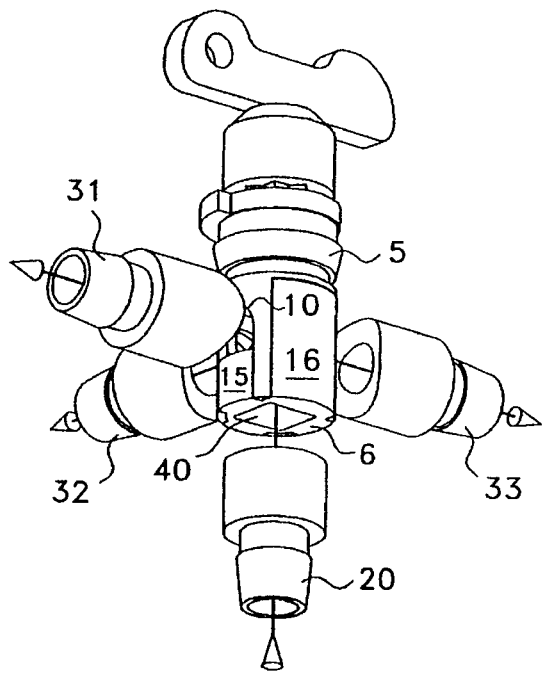
FIG. 10 is a parallel perspective of a second modality of valve with a lower inlet of flow and three alternative outlets shown in a condition of flow passing in its three outlets.

In FIG. 10 the valve with a compound stem oriented in a first rotation position is shown, so that the seal projection 16 of the flexible stem 6 is not obstructing any of the three flow outlets 31, 32 and 33. Flow inlet 20 is permanently in front of the lower opening 40 of the flexible stem 6 which is communicated with openings 8, 9 and 10 of rigid stem 5, said openings being—in this first rotation position of the compound stem—in front of the flow outlets 31, 32 and 33, respectively, the valve thus becoming in conditions to provide a free outlet of flow through its three outlet ducts.

Figure 11:
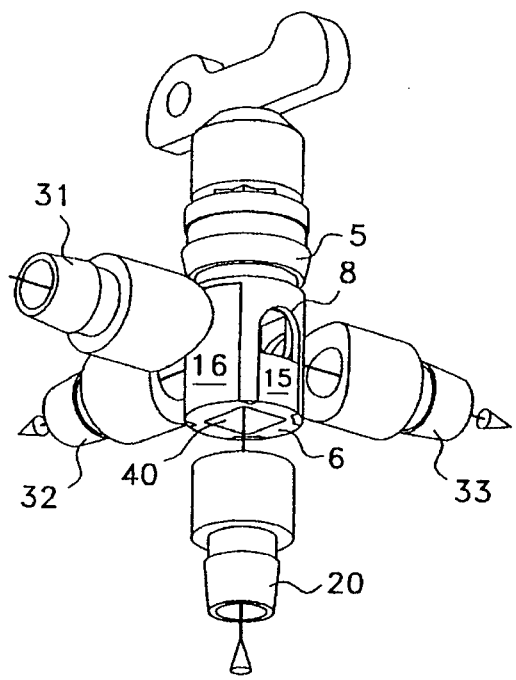
FIG. 11 is a parallel perspective of the valve of FIG. 10 in a closed condition for its first outlet and flow passing in its two remaining outlets.

In FIG. 11 a valve with the compound stem oriented in a second rotation position is shown, so that the seal projection 16 of the flexible stem 6 is obstructing the flow outlet 31. Openings 9 and 10 of rigid stem 5—in this second rotation position of the compound stem—are in front of the flow outlets 33 and 32, respectively. Opening 8 of rigid stem 5 is not in front of any outlet opening. In this condition the valve becomes to provide a free outlet of flow through its outlet ducts 32 and 33 and the outlet duct 31 is obstructed.

Figure 12:
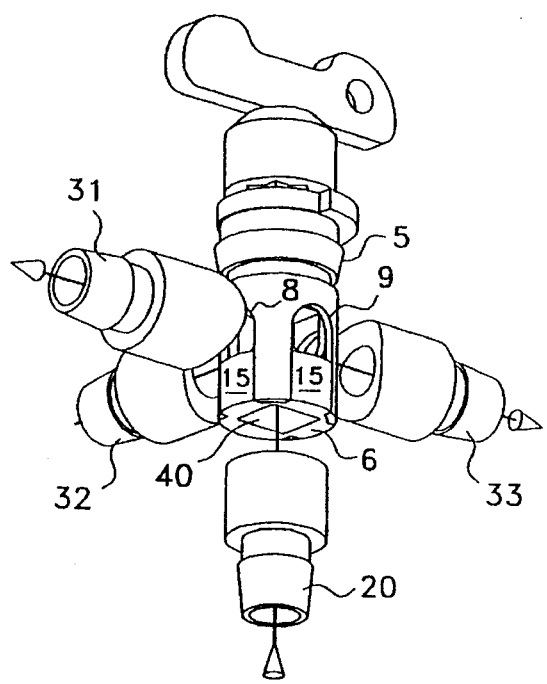
FIG. 12 is a parallel perspective of the valve of FIG. 10 in a closed condition for its second outlet and flow passing in its two remaining outlets.

In FIG. 12 a valve with the compound stem oriented in a third rotation position is shown, so that the seal projection 16 of the flexible stem 6 is obstructing the flow outlet 32. Openings 8 and 10 of rigid stem 5—in this third rotation position of the compound stem—are in front of the flow outlets 31 and 33, respectively. Opening 9 of rigid stem 5 is not in front of any outlet opening. In this condition the valve becomes to provide a free outlet of flow through its outlet ducts 31 and 33 and the outlet duct 32 is obstructed.

Figure 13:
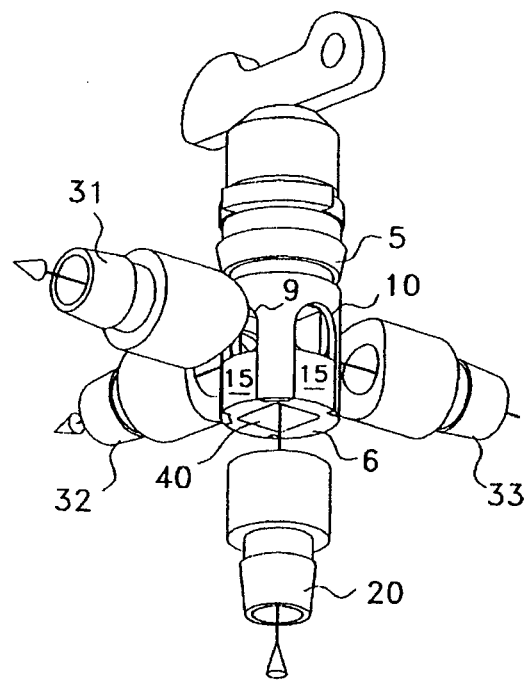
FIG. 13 is a parallel perspective of the valve of FIG. 10 in a closed condition for its third outlet and flow passing in its two remaining outlets.

In FIG. 13 a valve with the compound stem oriented in a fourth rotation position is shown, so that the seal projection 16 of the flexible stem 6 is obstructing the flow outlet 33. Openings 8 and 9 of rigid stem 5—in this fourth rotation position of the compound stem—are in front of the flow outlets 32 and 31, respectively. Opening 10 of rigid stem 5 is not in front of any outlet opening. In this condition the valve becomes to provide a free outlet of flow through its outlet ducts 31 and 32 and the outlet duct 33 is obstructed.

From this second example which considers a lower inlet of flow, certain obvious variants of the invention may be stated, depending on the number of outlets with which the valve body is equipped and depending on the level of rotation freedom of the compound stem.

Should the valve body has an outlet and the compound stem may rotate only 90°, then we have a flow valve of the cock and fitting type.

Should the valve body has two outlets at 90° and the compound stem may rotate 90°, then we have a valve which may have two conditions: a first condition with the first outlet opened and the second outlet closed, and a second condition inverse to the previous one, that is, with the first outlet closed and the second outlet opened.

Should the valve body has two outlets at 90° and the compound stem may rotate 180°, then we have a valve which may have three conditions: a first condition with the first outlet opened and the second outlet closed; a second condition inverse to the previous one, that is, with the first outlet closed and the second outlet opened; and a third condition with both outlets opened.

Should the valve body has two outlets at 180° and the compound stem may rotate 180°, then we have a valve which may have three conditions: a first condition with the first outlet opened and the second outlet closed; a second condition with both outlets opened and a third condition inverse to the first one, that is, with the first outlet closed and the second outlet opened.

What I claim is:

1. A flow valve, comprising:
   a) a body having a cavity therein, and an inlet and first outlet communicating with said cavity;
   b) a stem assembly disposed within said cavity, said stem assembly being movable between a closed position wherein one of said inlet and first outlet is blocked and an open position wherein flow is permitted from said inlet to said first outlet through said stem assembly, said stem assembly including openings for permitting flow therethrough from said inlet to said first outlet;
   c) said stem assembly comprising a rigid component and a flexible component;
   d) said rigid component including an upper portion extending outside of said body for receiving an actuator;
   e) said rigid component including a lower hollow portion having an inverted cup shape, said hollow portion including a plurality of legs extending outwardly therefrom;
   f) said flexible component being adapted to be supported within said hollow portion and interfitted between said legs; and
   g) said flexible component including an obstruction seal projection disposed between said legs, said obstruction seal projection being adapted to cover one of said inlet and first outlet when said stem assembly is in the closed position, thereby cutting off the flow through one of said inlet and said first outlet.

2. A flow valve as in claim 1, wherein:
   a) said obstruction seal projection is disposed across said first outlet when said stem assembly is in the closed position, said obstruction projection seal has an area larger than the area of opening of said first outlet; and
   b) said obstruction seal projection being deformable such that flow pressure from said inlet compresses said obstruction seal projection against said first outlet when said stem assembly is in the closed position.

3. A flow valve as in claim 1, wherein:
   a) said inlet and first outlet are disposed 180° relative to each other;
   b) said body includes a stroke limiting stop such that said stem assembly is rotatable to a maximum of 90°; and
   c) said obstruction seal projection is disposed only in front of said first outlet when said stem assembly is in the closed position and away from said inlet and first outlet when in the open position.

4. A flow valve as in claim 1, wherein:
   a) said flexible component is made from elastomer compound.

5. A flow valve as in claim 1, wherein:
   a) said flexible component includes an inverted cup lower portion and a plurality of openings disposed through said inverted cup;
   b) said rigid component includes openings disposed between said legs; and
   b) said flexible component plurality of openings are aligned with said rigid component openings when said flexible component is disposed within said hollow portion of said rigid portion.

6. A flow valve as in claim 1, wherein:
   a) said body includes a second outlet orthogonally disposed with respect to said inlet and first outlet;
   b) said body includes a stroke limiting stop such that said stem assembly is rotatable to a maximum of 90°; and c) said obstruction seal projection is disposed only in front of one of said first and second outlets when said stem assembly is in the closed position.

7. A flow valve as in claim 1, wherein:

a) said body includes a second outlet orthogonally disposed with respect to said inlet and first outlet; and b) said body includes a 180° stroke limiting stop when said stem assembly is rotated such that said obstruction seal projection may be disposed away from all of said inlet and first and second outlets.

8. A flow valve as in claim 1, wherein:

a) said flexible component includes a bottom opening communicating with said stem assembly openings;

b) said inlet is disposed at the bottom of said body and communicates with said flexible component bottom opening; and c) said body includes a 90° stroke limiting stop when said stem assembly is rotated such that said obstruction seal projection is disposed only in front of said first outlet when said stem assembly is in the closed position.

9. A flow valve as in claim 1, wherein:

a) said flexible component includes a bottom opening communicating with said stem assembly openings;

b) said inlet is disposed at the bottom of said body and communicates with said flexible component bottom opening;

c) said body includes a second outlet orthogonally disposed with respect to said first outlet;

d) said body includes a 90° stroke limiting stop when said stem assembly is rotated such that said obstruction seal projection is disposed only in front of one of said first and second outlets when said stem assembly is in the closed position.

10. A flow valve as in claim 1, wherein:

a) said flexible component includes a bottom opening communicating with said stem assembly openings;

b) said inlet is disposed at the bottom of said body and communicates with said flexible component bottom opening;

c) said body includes a second outlet disposed 180° relative to said first outlet; and d) said body includes a 180° stroke limiting stop when said stem assembly is rotated such that said obstruction seal projection may be disposed away from all of said first and second outlets when said stem assembly is in the open position.

11. A flow valve as in claim 1, wherein:

a) said flexible component includes a bottom opening communicating with said stem assembly openings;

b) said inlet is disposed at the bottom of said body and communicates with said flexible component bottom opening;

c) said body includes second and third outlets disposed orthogonally with respect to each other; and d) said stem assembly is rotatable to a maximum of 360° such that said obstruction seal projection may be disposed away from all of said first, second and third outlets when said stem assembly is in the open position.

* * * * *